July 14, 1964
J. J. CLARK
3,140,608
LIQUID LEVEL GAUGE
Filed Dec. 16, 1960
3 Sheets-Sheet 1
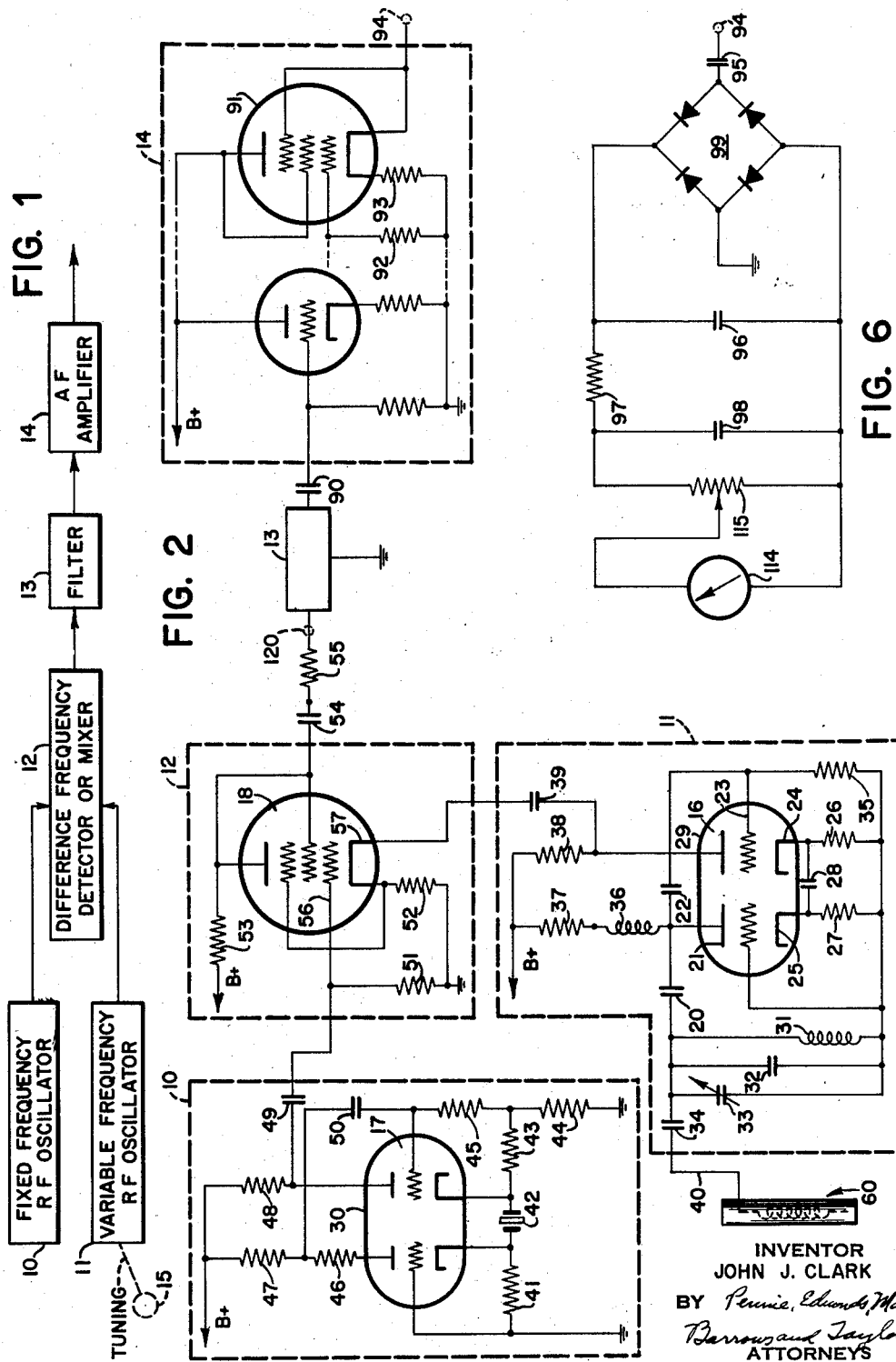
INVENTOR
JOHN J. CLARK
BY Pennie, Edmonds, Morton
Barrows and Taylor
ATTORNEYS

INVENTOR
JOHN J. CLARK

July 14, 1964    J. J. CLARK    3,140,608
LIQUID LEVEL GAUGE

Filed Dec. 16, 1960    3 Sheets-Sheet 3

INVENTOR
JOHN J. CLARK
BY
Pennie, Edwards, Morton, Barrows & Taylor
ATTORNEYS

3,140,608
LIQUID LEVEL GAUGE
John J. Clark, Hoboken, N.J., assignor to Brooks Equipment Corporation, Hoboken, N.J., a corporation of New York
Filed Dec. 16, 1960, Ser. No. 76,217
9 Claims. (Cl. 73—304)

This invention relates to an improved electronically operated gauge for automatically monitoring and controlling the level of a liquid in a vessel, tank or the like. More particularly, this invention relates to a capacitance type liquid level gauge which is suitable for safe and reliable operation in connection with containers for highly inflammable or volatile liquids where the containers themselves may have high static electric charges or may be made from electrically conductive materials.

Numerous electronically operated liquid level gauges have been devised in which capacitor or inductor type probes are adapted for mounting inside a liquid container. Previous capacitance gauges, for example, often comprise one or more bare capacitor probes connected in a bridge circuit from which signals reflecting bridge balance conditions provide intelligence information about the level of the liquid as the liquid level varies and changes the effective capacitance of the probe. Such gauges have been used for measuring liquid level in aircraft fuel tanks.

These prior art gauges work very well for their intended purposes. But to my knowledge, none has been heretofore devised which is acceptable for operation in containers for inflammable or volatile liquids where the containers themselves are fabricated from electrically conductive materials or are situated so that they may be expected to have high static electric charges.

There are two very important reasons for this:

Voltages used to excite probe circuits in prior art gauges are relatively high and the capacity of these circuits to deliver energy in the event of accidental grounding of the probe in a metallic tank would present a substantial risk of fire or explosion. Also, bare capacitor probes would be unsafe for operation where a static electric charge on the tank or container may be sufficient to draw an arc between the probe and the container wall.

The purpose of my invention is to provide an accurate and reliable electronically operated gauge which is safe and acceptable for use in fuel tanks or the like where static electricity and risk of accidental grounding present acute hazards. A particular purpose of my invention is to provide such a gauge for use in liquid transfer operations aboard petroleum tankers where, as is well known, hazards from static electric charges on the tanker hull demand implicit electrical safety in all equipment.

All activities aboard petroleum tankers are circumscribed by severe safety regulations. Among them, of course, is the requirement that all electrical power circuits shall be located only in especially protected areas of the ship. Traditional reliance on visual observation of liquid level by a deck hand and on manual control of filling operations, has remained despite the demand for electronic equipment to control such operations automatically. To my knowledge no prior probe system has been devised which will satisfy the safety regulations because either the circuits which would be used in the hold at the probe fall within the category of power circuits, as defined in the regulations, or limitations in the probe system do not permit location of associated power equipment at a satisfactorily remote or protected location. The probe system of my invention will meet these safety regulations both as respects the nature of the circuit in the hold and as respects the degree of remoteness of associated apparatus.

In its broadest aspects my invention comprises a capacitor sensing device or probe coupled to a beat frequency oscillator or heterodyne network from which an automatically variable signal is supplied to a rectifier and to direct current responsive instrument and control circuits. Magnitude of the D.-C. signal is directly related to the amplitude of the heterodyne output signal which in turn is automatically controlled by changes in capacitance at the probe. The specific instrument and control circuits for a particular application are provided in accordance with the desired function which may be indicating and recording of liquid level, flow rate and shut-off control and automatic filling, as in a reserve or process tank.

The beat frequency oscillator comprises fixed and variable radio frequency oscillator circuits, a mixer or detector circuit to which the output signals of the two oscillator circuits are coupled, a low pass band filter having a decreasing transfer characteristic over its pass band and having very sharp cut off characteristics for eliminating all but the desired audio frequency components from the mixer signal, and amplifier circuits to raise the power level of the A.-F. signal from the filter.

A variable resonance LC tuning circuit is provided at the variable frequency oscillator for frequency control. The probe to ground (i.e., container wall) capacitance is an integral part of the resonant circuit. A low capacitance shielded cable such as a coaxial cable is used to connect the probe to the resonant circuit. One of the major features of my invention is that the probe may be separated from the remainder of the equipment by as much as several hundred feet. The power, oscillator and control equipment as well as the operators may be housed in protected areas at very substantial distances from a tank containing volatile, inflammable or toxic material.

Provision is made for tuning the resonant circuit to provide a reference or "empty" beat frequency signal once the probe is installed and the length of cable to be used has been established. For reference tuning, a manually adjustable capacitor is located in the resonant circuit at the variable frequency oscillator. Thus, with a fixed frequency oscillator signal of, for example, 100 kc., the variable oscillator may be set to provide a signal of 98.7 kc. when the probe and cable are in place and the tank is empty. These two signals are fed to the mixer (or "detector") and a signal is obtained which contains an audio or beat frequency component as well as several radio frequency components. The radio frequency components in this signal are attenuated by the filter. The audio frequency component, which corresponds to the difference frequency (in this example 1.3 kc.), is passed by the filter and fed onward in the system as above indicated.

According to my invention I utilize a filter which has a sharp cut off characteristic outside a narrow audio frequency pass band. For the illustrative radio frequencies above, the pass band width may be 200 cycles. Also, the filter is tuned at a frequency below that of the A.-F. components and has a decreasing response characteristic in the pass band so that as the difference or beat frequency increases, the amplitude of the filter output signal will decrease—as long as the frequency of the filter signal remains within the limits of the pass band.

One basic form which my invention may take is a maximum liquid level, shut-off embodiment. In this embodiment the filter attenuates all signals except the reference A.-F. signal from the mixer. As liquid level rises and meets the probe in the tank, a series capacitance greater than that of air is presented between the probe and ground. Capacitive reactance at the probe (and at the resonant circuit) decreases, thereby decreasing impedance of the resonant circuit. The resonant frequency of the variable oscillator is diminished and the difference frequency is increased. The new A.-F. component at the filter is also attenuated, being outside the pass band, and, subsequently in the system, the D.-C. voltage disappears, D.-C. responsive components revert to de-energized positions and valve shut-off circuits are actuated.

The probe used in this form of the invention comprises a short inductor encased in an insulating material having a low dielectric coefficient. For all practical purposes, no power is required to operate the probe and probe operating voltage is in fact very low. Thus, in a tanker installation for example, even if the probe inductor should be accidentally grounded any current drain would be insufficient to cause ignition.

I have used up to ½ inch of fluorocarbon material for insulating the probe so that the chances of accidentally grounding the probe in a tank are virtually nonexistent. What is more, with ½ inch of such insulation surrounding the inductor it is safely insulated from static charge on the container or tanker, even though the charges may have a potential of over 25,000 volts, and probe operation is not adversely affected.

Another basic form of my invention is an embodiment for continuously monitoring liquid level. In this case the length of the probe is made equivalent to the difference in liquid levels to be observed. The principles of operation are similar to those described above. But according to this aspect of the invention, the mixer A.-F. signal will vary between a minimum or reference frequency and a maximum frequency within the filter pass band.

Where it is desired to have a continuous indication of the liquid level in a tank during a filling or emptying operation the probe which I provide is similar to that described above except for overall length and the number of turns per foot in the probe coil. With the probe installed in a tank, the resonant circuit is adjusted to provide the reference or "empty" beat frequency signal. When the liquid reaches the bottom of the probe, probe to ground capacitance will increase sufficiently to provide a different intelligence signal. As before, the VFO frequency is decreased, but only a small amount, viz., a few cycles. The audio component from the mixer is raised in frequency and amplitude of the filter signal is diminished.

As liquid level continues to rise, for example, capacitive reactance between probe and ground continues to diminish and the difference frequency continues to increase. With increasing amplitudes of the A.-F. component, magnitude of the D.-C. signal at the control end of the system will decrease and instruments and control circuits are provided which are responsive to changes in magnitude of the D.-C. signal.

When maximum liquid level is reached, the shut-off function can also be provided in conjunction with this aspect of my invention. Thus the shut-off action previously described can be initiated when, because of diminishing frequency at the variable oscillator, the frequency of the beat or A.-F. signal becomes greater than the upper pass band cut off frequency of the filter. Filter output then goes to zero and remaining system reaction is the same as previously described for the shut-off embodiment.

Now, total capacitance change at the probes in my invention will be very small. In order to apply the heterodyne principle in my invention it has been necessary to provide a variable frequency oscillator which is exceptionally stable, since the total operating range for the VFO may be, as illustrated, not wider than 200 cycles. I have provided a two stage cathode coupled oscillator for this purpose. The anode of the generator stage is connected so that its effective plate resistance is changed, to vary oscillator frequency, in response to changes in resonant impedance of the probe circuit. The generator stage is carefully matched to an amplifier stage and feedback from the amplifier is made constant with frequency over the operating range. In the operating range this oscillator is stable to within ±1 c.p.s. and liquid level readings can be obtained which will be accurate to within the range of liquid level variation due to turbulence during filling.

Details of these and of other features of the present invention are explained in the following portion of the specification. For clarity reference will be made to the accompanying drawings in which:

FIG. 1 is a block diagram of a heterodyne network for my invention;

FIG. 2 shows details of a heterodyne network and tuning circuit for a shut-off control embodiment of my invention;

FIG. 6 illustrates the connection for an instrument circuit arrangement for a continuous liquid level monitoring embodiment of my invention.

Figure 3:
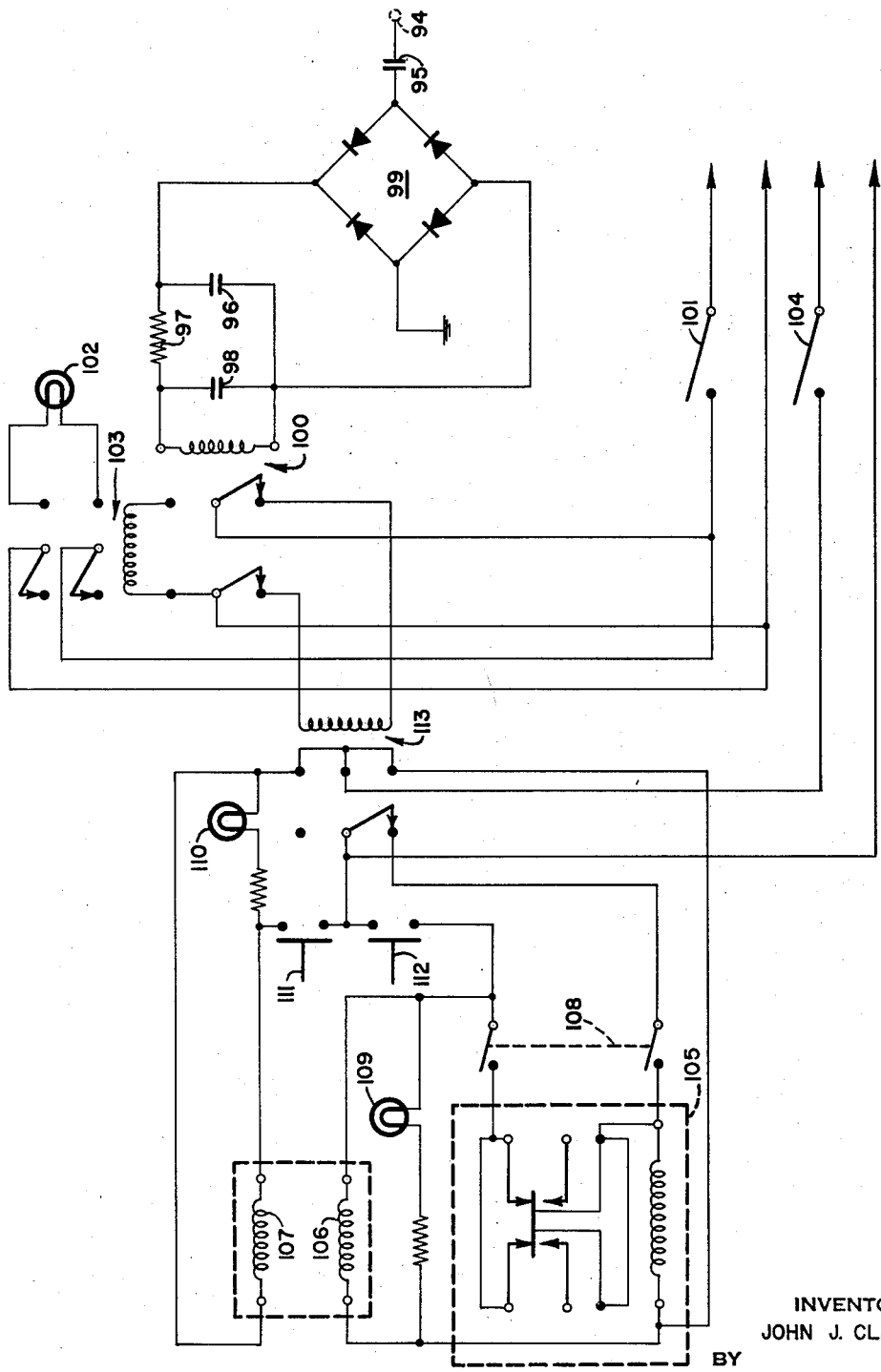
FIG. 3 shows a control circuit arrangement for operation with the embodiment of FIG. 2.

In FIG. 1 the general arrangement of principal components for a heterodyne network or beat frequency oscillator is shown in block form. As is well known, such an oscillator comprises a fixed frequency oscillator 10 and a variable frequency oscillator 11 which operate at different frequencies. The output signals from both are superimposed in a difference frequency detector or mixer 12 producing a modulated wave form. For present purposes, oscillators 10 and 11 operate at slightly different radio frequencies to produce a modulated wave from which an audio frequency signal is obtained. This is done by supplying the signal from mixer 12 to a filter 13 to eliminate radio frequency components. The audio frequency signal from the filter is then amplified at 14 to provide a signal of sufficient strength for controlling subsequently connected apparatus.

For suppression of harmonics in a heterodyne network a R.F. filter is frequently interposed between oscillator 10 and the detector. However, in accordance with my concept, the desired range of audio frequencies is quite narrow and suppression of R.F. harmonics at the fixed frequency oscillator is not necessary.

Provision for tuning the variable frequency oscillator is indicated at 15. There are many well-known circuit arrangements for tuning a variable frequency oscillator. As will be subsequently explained in further detail, I provide variable capacitance for controlling a variable resonance circuit to effect changes in the frequency of the output signal from this oscillator.

FIG. 2 shows details of a heterodyne network for my invention. To completely illustrate one operative embodiment of my invention, characteristics of particular circuit components which I have used are compiled below in tabular form.

For simplicity, connections to the direct current power supply are indicated in the drawings at the arrows marked B+. Details of the direct current power supply as well as circuitry for the heaters of the several vacuum tubes have been omitted from the drawings, as they are well-known and form no part of the present invention. The components identified in the tables following are for operation where the D.C. voltage at the points marked B+ is 350 volts above ground.

A cathode coupled crystal controlled type vacuum tube oscillator is shown at 10 in FIG. 2. In a preferred form, the values of the circuit components for this oscillator are selected so that its output signal has a frequency of 100 kilocycles. Components for this oscillator which I have used are identified in Table I.

Table I

| Identifying Numeral: | Component [1] |
|---|---|
| 17 | Vacuum tube 12AU7. |
| 41 | Resistor 6.8K. |
| 42 | Crystal XTAL. |
| 43, 44 | Resistor 3.3K. |
| 45 | Resistor 220K. |
| 46 | Resistor 22K. |
| 47 | Resistor 15K (2 watt). |
| 48 | Resistor 10K (2 watt). |
| 49, 50 | Capacitor 470 $\mu\mu f$. |
| 18 | Vacuum tube 6AG5. |
| 51, 52, 55 | Resistor 10K. |
| 53 | Resistor 15K. |
| 54 | Capacitor .01 $\mu f$. |
| 80 | Capacitor .01 $\mu\mu f$. |
| 81 | Inductor 1.277 h. |
| 82 | Inductor .0129 h. |
| 83 | Inductor .567 h. |
| 84 | Capacitor .02 $\mu\mu f$. |
| 85 | Capacitor .1 $\mu\mu f$. |
| 86 | Inductor .244 h. |
| 87 | Inductor .00648 h. |
| 88 | Inductor .642 h. |
| 89 | Capacitor .02 $\mu\mu f$. |

[1] All resistors are ½ watt unless specified otherwise.

The variable frequency oscillator is shown at 11. This oscillator is also a cathode coupled vacuum tube type. A resonant circuit is coupled through capacitor 20 to plate 21 and successively through capacitor 22 to grid 23 of tube 16 for controlling the oscillation frequency. Cathode 24 and cathode 25 of tube 16 are independently biased by resistances 26 and 27 and are coupled by capacitor 28. Cathode coupling capacitor 28 provides a relatively small impedance compared to the cathode resistances and hence a feedback is obtained which does not vary appreciably with frequency.

It should be noted that tubes 16 and 17 of the oscillator circuits are indicated as twin triodes each having a single evacuated envelope (29 and 30). This particular twin triode arrangement is a convenient one but other arrangements employing two separate vacuum tubes may also be used.

The resonant or tank circuit of variable oscillator 11 comprises a parallel arrangement of inductor 31, capacitor 32, variable capacitor 33 and a low capacitance cable 40 connected to a variable capacitor sensing device or probe 60. A large isolation capacitor 34 is provided between the probe 60 and the balance of the circuit to insure that no D.-C. voltage will appear at the probe. Variable capacitor 33 is provided for field tuning of the oscillator to a prescribed frequency different from the 100 kilocycle frequency of oscillator 10. This prescribed frequency may be, for example, 98.7 kilocycles whence a normal beat frequency, which I choose to refer to as a reference difference frequency, of 1.3 kc. is established.

It should be understood that the size of capacitor 32 is determined for individual installations in which the embodiments of my invention may be used. This is done to establish necessary sensitivity in the tuning circuit over the range of tuning established for the variable oscillator 11. Then, of course, the reference variable oscillator frequency can be established within the fine range of tuning offered by capacitor 33 upon initiation of tank filling operations. The size of capacitor 32 for the circuit shown is such as to make the total of the cable capacitance in the tuning circuit (exclusive of isolation capacitor 34) plus capacitance 32 equal to approximately 4500 $\mu\mu f$. In an embodiment for the shut-off control function in a petroleum tanker with 400 feet of RG114AU cable, for example, a 1900 $\mu\mu f$ capacitor, indicated in Table II, would be used.

By feeding the output signals of the two oscillators to grid 56 and cathode 57 of the detector tube 18, a beat wave grid to cathode voltage is obtained. Tube 18 is biased for non-linear operation so that modulated output signal which contains no audio or beat frequency energy component is obtained. The audio component, for this example 1.3 kc., is subsequently passed by filter 13 and it is the reference audio frequency signal which is fed to subsequently connected apparatus in the system.

The variable frequency oscillator of my invention has been devised to meet requirements for extremely stable operation. It will, for example, oscillate at a given frequency setting such as 98.7 kc. without drifting more than 1 cycle either way. Since the total range of controlled frequency change for this oscillator is never more than 200 cycles, such stability is essential for providing accuracy and reliability in my liquid level gauge.

Variable frequency oscillator components which I have used for one embodiment of my invention are identified and tabulated in Table II. This embodiment is for automatic sensing of liquid level and for shut-off control in the hold of a petroleum tanker. Typical control circuitry for this embodiment is shown in FIG. 3 and further identified in Table II below.

Table II

| Identifying Numeral: | Component [1] |
|---|---|
| 16 | Vacuum tube 12AU7. |
| 20 | Capacitor 0.1 $\mu f$. |
| 22, 39 | Capacitor 470 $\mu\mu f$. |
| 26 | Resistor 3.3K. |
| 27 | Resistor 10K. |
| 28 | Capacitor .006 $\mu f$. |
| 31 | Inductor 2.5 mh. |
| 32 | Capacitor 1900 $\mu\mu f$ [2] |
| 33 | Variable capacitor 0–180 $\mu\mu f$ |
| 34 | Capacitor 0.2 $\mu f$. |
| 35 | Resistor 330K. |
| 36 | Inductor 5 mh. |
| 37 | Resistor 10K. |
| 38 | Resistor 10K (2 watts). |
| 40 | Coaxial cable RG114AU. (400 feet) |

[1] All resistors are ½ watt unless specified otherwise.
[2] C32 equals 4500 (cable capacitance) $\mu\mu f$.

Figure 4:
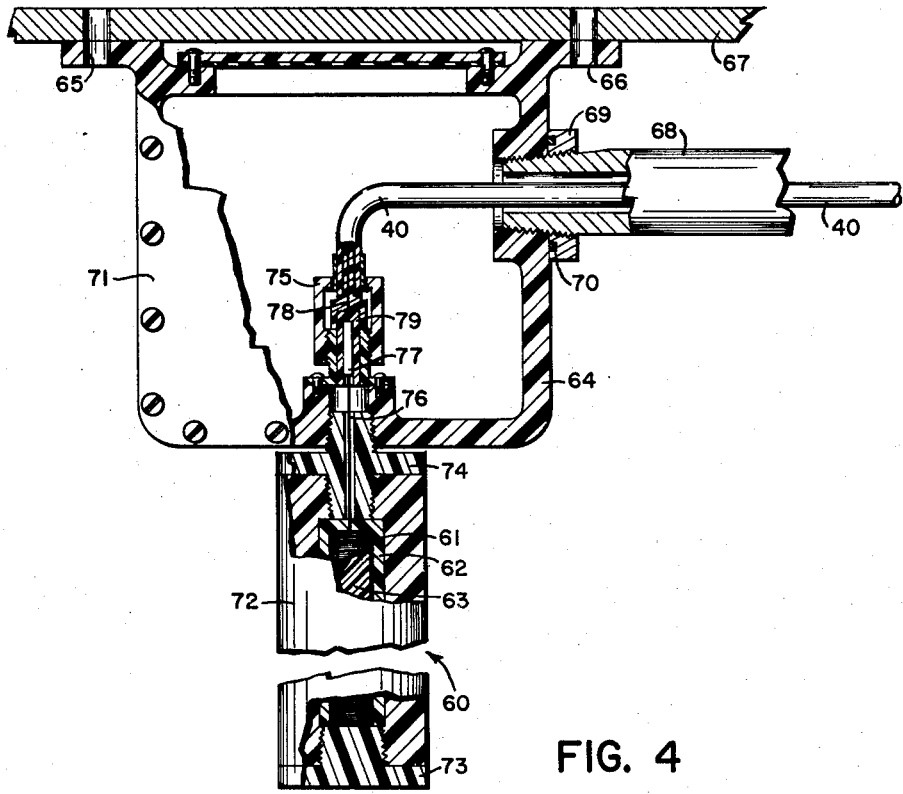
FIG. 4 shows the details of an embodiment of the capacitor probe of my invention for operation in the hold of a petroleum tanker.

Capacitor probe 60 of my invention is shown in detail in FIG. 4. The probe comprises a coil 61 which is totally encased in an insulating material 62. Coil 61 is wound to the desired length on a solid core 63. For the probe core I have used 1 inch diameter cylinders of the same material as insulating material 62.

Several fluorocarbon materials are suitable for the core 63 and for the encasing insulation 62. A readily available commercial fluorocarbon which I have used for this purpose is a tetrafluoroethylene polymer known by the trademark "Teflon" manufactured by the E. I. duPont de Nemours Company. This material may be readily cast in desired forms or sprayed to build up a shape of desired thickness.

For probe 60 of my invention, I have used a solid core of "Teflon" and then cast the additional "Teflon" insulation in place on the wound coil to provide a homogeneous insulation sheath of ⅛ inch thickness. Breakdown potential for such a sheath would be in excess of 5000 volts.

Probe 60 is connected to capacitor 34 at the variable oscillator tuning circuit by means of a low capacitance cable such as a coaxial cable shown at 40. Cable 40 permits the remainder of the apparatus to be placed several hundred feet away from the tank or vessel in which the probe is operated so that all high voltage equipment can be remote from the volatile or inflammable environment (or perhaps a toxic environment) of the liquid being transferred. More than 400 feet of RG114AU coaxial cable may be used for this purpose, or various lengths of other cable types may be provided.

The probe in FIG. 4 is shown adapted for mounting in the hold of a petroleum tanker where, as mentioned, very high static electric charges may be anticipated.

A sealed housing 64 is attached as by bolts at 65 and 66 to a structural member 67 over the center of the hold. The housing, which includes a detachable cover plate 71 for access, is also fabricated from an acceptable insulating material. I have again used the fluorocarbon material "Teflon," identified above, for the housing because of its availability and because it provides adequate strength with convenient thickness. The housing is drilled and tapped at its side to receive a threaded conduit 68 in which a portion of cable 40 is permanently supported. A lock nut 69, provided with a gasket ring 70, is tightened against the side of the housing after the conduit is positioned to seal the conduit opening. The remainder of the conduit is not shown but it is sufficient to indicate that the conduit extends out of the hold to a remote point.

The probe 60 is provided with additional insulating covering comprising a tube 72, a threaded lower sealing plug 73 and a nipple 74. Nipple 74 also has a flange extending outward from its center portion so that the upper end of tube 72 can also be sealed when the nipple is in place as shown. I have also used "Teflon" for parts 72, 73 and 74.

The housing 64 is also drilled and tapped at the bottom to receive the upper threaded portion of nipple 74. A plug and jack arrangement is then used to connect the center conductor of the cable to one end of coil 61 of the capacitor probe. An insulating structure 75 (for which I again use "Teflon" throughout) is mounted at the inside of the lower tapped opening in the housing to support the end of the cable and further to cover and seal the cable to probe connection.

One end 76 of the probe coil is led through the nipple 74 and connected to a plug 77. The center conductor 78 of the cable, which is insulated from the rest of the cable as well, is connected to a jack 79 to complete the arrangement.

The fluorocarbon cover of tube 72 and plug and nipple parts 73 and 74 provide an additional thickness of insulation around the probe 60. The thickness for the embodiment shown is approximately half an inch in any direction from the probe so that a static charge on the wall of the tanker far in excess of 25,000 volts would be necessary to draw an arc from coil 61 to ground.

Similarly, the housing 64 and insulating structure 75 are provided to insulate the cable to coil connection from static charge. In addition, any remaining spaces, indicated as void in FIG. 4, in the probe and housing may be pumped full of suitable liquid insulating material if further protection is desired. All parts are gasketed or otherwise made to provide sealed joints so that a liquid insulator can be readily contained.

Accidental grounding of the probe in the tank is, therefore, only remotely possible. But, as has been indicated, the capacity of the probe portion of the resonant circuit to deliver power in the event of an accidental short circuit is inconsequential. Probe operating voltage is very low and if grounding did occur at the coil, current flow would be only a few microamperes, grossly insufficient to heat and ignite the fuel.

Thickness of tube 72 may be made more or less for other installations. Although this would change the probe to ground capacitance, appropriate capacitor adjustment can be made, if necessary, in the resonant tuning circuit at the variable frequency oscillator.

For the shut-off control embodiment of my invention, the total probe length is about 6½ inches. I provide a coil 61 of 2.7 millihenrys by winding 814 turns of No. 28 AWG insulated copper wire to a length of 5½ inches. The probe is then supported, as in FIG. 4, with its lower end at an elevation two to three inches below the maximum desired liquid level in the hold.

Figure 5:
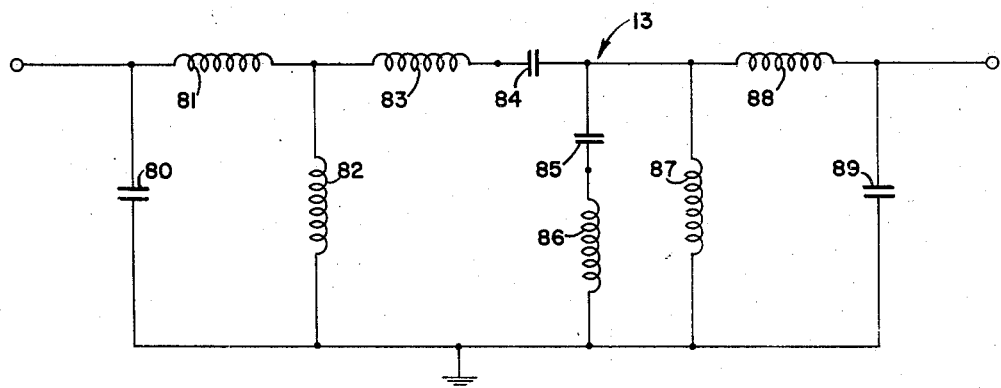
FIG. 5 shows details of a filter of my invention for operation in the heterodyne network of FIG. 2.

Details of a filter 13 for the maximum liquid level or shut-off control embodiment are shown in FIG. 5. Filter components are also tabulated in Table I. This filter is rated at 1.3 kc.±7.5% at the half power points (3 db). It has very sharp cut-off characteristics so that only audio frequency signals falling within the pass band, which is approximately 200 cycles wide, will be transmitted.

The audio signal is fed from filter 13 through capacitor 90 (see Table III) to amplifier 14. Amplifier 14 comprises a series of stages in a standard arrangement which will be apparent to those skilled in the art. It is sufficient to indicate that the first stage operates class A; the second, class AB–B (controlled) and the third, class C. The class C stage also acts as a limiter stage which serves to eliminate system and amplifier noise inherent in the network and preserve accuracy. The class C stage output is then fed to the grid of cathode follower stage 91. Cathode follower components which I have used are tabulated below in Table III.

*Table III*

| Identifying numeral: | Component |
| --- | --- |
| 90 | Capacitor .01 µf. |
| 91 | Vacuum tube 6AQ5. |
| 92 | Resistor 560K (½ watt). |
| 93 | Resistor .6K (10 watt). |
| 95 | Capacitor .01 µf. |
| 96, 98 | Capacitor 10 µf. |
| 97 | Resistor .068K. |
| 99 | Rectifier FTR No. 1016. |

The signal from the cathode follower is fed to a rectifier. The connection for this is indicated at 94 in both FIGS. 2 and 3. The rectifier and subsequent smoothing filter are shown in FIG. 3 and further identified in Table III.

Purpose and function of components in FIGS. 2–5 not as yet identified or described in detail will become evident from the following description of operation of the shut-off control embodiment.

Before a filling operation is started, the end of cable 40 is connected at the remote end of conduit 68 so that probe 60 (FIG. 4) can be excited. As has been indicated, the heterodyne network as well as the balance of the electrical apparatus, is then conveniently located at a control station a safe distance from the tank to be filled.

Equipment power is turned on for warm up and capacitor 33 is adjusted to provide the desired probe circuit resonant frequency. For oscillator 11, I have found it desirable to set this frequency at 98.68 kilocycles making oscillator output slightly capacitive (i.e., with a leading current vector). With this setting, frequency stability of the oscillator is ±1 cycle per second.

The reference difference frequency of oscillators 10 and 11 is then 1320 c.p.s. The 100 kilocycle signal of oscillator 10 and the 98.68 kilocycle signal from oscillator 11 are fed to the detector 18 in the manner described. It should be noted that the amplifier stages of both oscillators also serve as buffers to isolate the oscillators from effects of changes in their load impedances.

The reference audio frequency signal of 1320 c.p.s. is passed by filter 13 (all other components in the detector output being attenuated) and amplified at 14. The cathode follower 91 receives a modified square wave voltage at its grid. The follower tube is biased well beyond cut-off (while the tank is empty and before the fuel level reaches the probe 60) and the tube conducts providing a signal voltage at its cathode.

The cathode follower signal is coupled through capacitor 95 (FIG. 3) to a selenium bridge rectifier 99 to provide a direct current control signal. After smoothing the D.-C. signal is used to energize the coil of a sensitive relay 100.

Signal switch 101 is next closed to provide power to a red indicator light circuit. This circuit is intended for operation on 110 volts A.-C. The contacts of relay 100 are normally closed as indicated in FIG. 3 and when the relay is energized by the D.-C. voltage delivered from rectifier 99, the contacts will change over to provide power to relay 103 to complete the circuit to the red indicator light 102. This light is, therefore, always lighted while the filling operation is in process before the maximum liquid level is reached.

When the red light appears, timer power switch 104 is closed to provide power to a time delay relay 105. This relay is part of a solenoid circuit for automatic closing of a valve in the fuel supply pipe. Power to this circuit is intended to be 220 volts A.C.

After closing timer power switch 104, control switch 108 at the time delay relay is closed so that the valve closing circuit will receive power at the proper time.

Bypass switches "push to open" 111 and "push to close" 112 are for manual operation of the valve circuit. As shown in FIG. 3, valve opening is done manually by pushing switch 111 thus energizing "open" coil 107 (and lighting a white light 110). This arrangement is in keeping with operating practices presently prescribed for the petroleum tanker fuel transfer procedure but circuit arrangements could be readily provided for automatic valve opening if desired.

Manual closing may be obtained by removing power to the electronic system, opening switches 101 and 108, and closing switch 104. Operation of the valve indicator, and control circuit under these conditions is the same as above described.

Briefly then, as the liquid level in the fuel tank is rising, i.e., before it has reached the probe 60, the difference frequency signal of 1320 c.p.s. is passed through the filter 13 and amplified. A cathode follower stage transmits the amplified signal to a rectifier 99. A corresponding D.-C. signal is provided and a control circuit responsive to the D.-C. signal is energized.

When the rising liquid reaches the probe it offers an increased series capacitance (as compared to that previously existing with the probe in air). This may be illustrated by the relation: $C = .2244 \, k. \, A/d$, where C is in $\mu\mu f$, K is the dielectric constant of the liquid, A is the area of the probe (square inches) in contact with the liquid and $d$ is the distance (inches) through the liquid from probe to ground.

Hence when the probe and liquid are placed in contact, the impedance of the probe circuit and of the mesh or variable resonance circuit at oscillator 11, are reduced. (Capacitor 34 is too large for reactive effect.) Thus the bias at cathode 25 is raised thereby effectively increasing the plate resistance of the generator stage of the tube 16 and lowering its frequency.

This change in frequency of the variable oscillator output is reflected through the system as follows:

Decreasing frequency of oscillator 11 increases the difference or beat frequency detected and fed by the mixer 18 to the filter. Now if, instead of oil, an aqueous solution were flowing into the tank, the change in difference frequency would be fairly great. But as here illustrated for a non-aqueous liquid, the change in difference frequency will be quite small. Hence, as has been described, filter 13 is necessarily one with a narrow pass band and with very sharp cut-off.

With the short probe described, a small amount of additional liquid level rise will be sufficient to increase the difference frequency by more than 200 cycles. As a consequence, the difference frequency signal is thereupon completely attenuated by the filter and no signal is fed to the amplifier 14. The signal at cathode follower 91 disappears, its grid bias becomes zero and the follower tube is cut off. With the follower tube cut-off, the signal voltage at its cathode disappears and the D.-C. power to relay 100 is removed.

With no D.-C. power, relay 100 returns to its normal position dropping relay 103 (shutting off the red light) and picking up relay 113. Whence the close coil 106 is energized for a pre-selected time which may be 15 seconds, blue light 109 is lighted and the solenoid operated valve closes shutting off the flow of oil.

I also provide a continuous liquid level monitoring embodiment in my present invention. The theory and general features for this gauge are similar in many respects to those of the shut-off or maximum level sensing embodiment above. To provide an understanding of the distinguishing features of my continuous level monitoring embodiment I shall again illustrate with a description of apparatus adapted for operation during filling of a petroleum tanker.

Referring again to FIG. 4, the probe 60 is provided with an overall length equivalent to the difference in elevation over which liquid level is to be observed. This distance may be, for example, thirty feet. Coil 61 is wound as before but the winding rate for the insulated wire mentioned is different. I have wound such a coil with 360 turns per foot. Other wire sizes can be used in which case the winding rates would have to be adjusted to provide a coil having an inductance suitable for operation in the probe arm of the tuning circuit. Remaining probe and housing components are as previously discussed.

To provide a variable resonance tuning circuit, which will be responsive to the small changes in capacitance as liquid level rises along this longer probe, the circuit arrangement shown in FIG. 2 is used with a 0.005 $\mu f$ capacitor substituted at 34 and a 5 mh. inductor substituted at 31. Other components identified in Table II are as before except for capacitor 32. Again, as has been described, capacitor 32 is selected for the particular installation so that when it is added to the capacitance of cable 40, the total capacitance is about 4500 $\mu\mu f$. If, for example, 300 feet of RG 62U coaxial cable is used, capacitor 32 will be 150 $\mu\mu f$.

One other modification in the heterodyne network shown in FIG. 2 is necessary to provide a gradually changing audio signal (as the frequency of variable oscillator 11 decreases and the difference or beat frequency increases) from filter 13. A capacitor is connected ahead of filter 13 between the terminal (shown dotted) identified by number 120, and ground. I have used a .001 $\mu f$ capacitor for this purpose.

The filter for this embodiment comprises the same components previously enumerated. But now the transfer function of the filter within its 200 cycle pass band is important. Between the cut-off points, this function decreases with frequency. The filter is, in fact, tuned below the audio frequency intelligence signals of interest which are between 1300 and 1500 c.p.s., approximately. Previously it was only desirable to pass one signal at 1320 c.p.s. and the probe and tuning circuit were provided so that the total change in tuning capacitance at the probe occurred over a very short distance of probe length. Hence all other signals fell outside the pass band and were attenuated, as has been described.

Now, the probe and tuning circuit are provided so that the total change in tuning capacitance at the probe is not completed until the tank is full. It is not until that point that the difference frequency will provide an audio signal that is fully attenuated so the shut-off function can be obtained with the continuous monitoring embodiment also, if a control circuit such as in FIG. 3 is used.

An illustrative connection for a meter 114 is shown in FIG. 6. Such a meter may be calibrated to indicate depth of liquid in response to changes in D.C. voltage across a resistance 115, as the amplitude of the A.-F. signal from filter 13 and amplifier 14 increases. A continuous recording meter may also be used.

Operation of this embodiment is in other respects as previously described for the apparatus of FIG. 2. Thus, as the oil in the hold of the tanker reaches the bottom of the probe, variable oscillator frequency will be reduced slightly from the reference. The frequency of the audio component in the detector signal will be slightly greater than the reference difference frequency and filter output will decrease. The indicator at 114 will move from, for example, an "empty" reading, indicating the depth of liquid at the bottom of probe 60. As oil level rises, series capacitance at the probe will continue to increase.

This can be illustrated from the relation $$C = \frac{7.4Kh}{\log \frac{b}{a}}$$

where C is in $\mu\mu f$, $h$, $b$ and $a$ are in feet, K is the dielectric constant of the liquid, $h$ is the overally length of the probe, $b$ is the distance from probe to tank, and $a$ is the radius of the probe.

For example, with $K=3$ for oil, $h=30$ feet, $b=30$ feet and $a=\frac{1}{2}$ inch, $$C \text{ empty} = \frac{7.4 \times 1 \times 30}{\log 720} = \frac{222}{2.86}, \text{ whence}$$

when the oil is below the probe, $C=77.5$ $\mu\mu f$. When the full height of the probe is immersed in oil, $C$ full $=3 \times C$ empty $=232$ $\mu\mu f$, for a total change in capacitance of 155 $\mu\mu f$ or an increase of .42 $\mu\mu f$ for every inch of level rise.

As capacitance at the probe increases, the difference frequency will continue to increase, the filter signal amplitude will continue to decrease and so on, until the hold is full, with the meter 114 giving a continuous depth reading all the while. Subsequently, the D.-C. signal voltage will disappear as the difference frequency exceeds the upper limit of the filter pass band and performance of the shut-off function is then in order, which, as indicated, may also be provided automatically by using a circuit such as in FIG. 3, with this embodiment.

The variable frequency oscillator of my invention has an exceptional stability, as has been indicated previously, of ±1 cycle per second at any setting within 200 cycle operating range of from 98.68 kc. to 98.48 kc. If this were not so, changes in oscillator frequency from extraneous causes would exceed those desired specifically from the frequency control variable resonance circuit and it would be impossible to obtain intelligence signals from the probe.

To obtain such stability, first of all, the variable resonance tuning circuit is a low Q inductive circuit. This circuit including inductance 31, capacitances 32 and 33 and the cable and probe capacitance, is tuned to the first subharmonic of the generator portion of tube 16. That is to say, the generator operates at the first harmonic of the variable resonance circuit.

Secondly, of course, the generator must be properly loaded. Noting the circuit parameters identified in Table II, a straightforward calculation will show that there is an impedance match between the generator and amplifier triode structures of tube 16 of approximately 2:1 for this purpose.

When liquid level reaches the probe, the variable resonance circuit becomes more capacitive and, as described, its impedance decreases thereby raising cathode 25 bias, raising effective plate resistance in the generator and decreasing oscillator frequency. But the increase in effective resistance at plate 21 does not appreciably affect the output of the oscillator because this resistance is part of the impedance circuit looking into the amplifier portion (tube 16); the change in impedance match compensates for the change in plate resistance and the regenerated voltage from the amplifier portion remains constant.

Additionally it should be noted that the small changes in variable oscillator frequency do not appreciably affect bias of the detector tube 18. The difference frequency or A.-F. component in the detector output signals is, therefore, supplied to the filter 13 without distortion.

And finally, for stability, I provide an inductive impedance, at 36 in FIG. 2, between anode 21 and the source of D.-C. potential. Small variations in plate voltage and component values would normally cause the bias of cathode 25 to change thereby causing a frequency variation. By providing inductor 36, such tendencies are regulated because of the 180° phase differential between the inductor and the interelectrode capacitances of the tube.

With the variable frequency oscillator and the tuning circuit in the continuous liquid level monitoring embodiment described, oscillator frequency will be reduced 200 cycles when the probe becomes fully immersed in oil. With the thirty foot probe this means that oscillator frequency will change 1 c.p.s. ±1 c.p.s. for every .755 $\mu\mu f$. change in probe capacitance or for every 1.8 inch of liquid level rise. Since the stability of the oscillator in the operating range is ±1 c.p.s., my invention is, therefore, accurate to ±1.8 inches of petroleum in the hold of the tanker. This accuracy tolerance of ±1.8 inches is negligible in practice because turbulence as the tank is filling will cause undulations or ripples at the surface of the oil which have amplitudes of approximately the same dimension.

My invention can be used for monitoring and controlling flow of many liquids including aqueous and non-aqueous solutions. It has, for example, been operated experimentally and successfully for several months in sewerage tanks. The principal criterion for determining applicability is that the liquid or fluid to be monitored or controlled must have measurable dielectric properties. Once the dielectric constant is determined for a particular liquid in a specific ambient operating temperature range, the tuning circuit of the beat frequency oscillator can be readily adjusted for proper performance.

I have described my invention with detailed reference to particular embodiments thereof. It should be understood that changes from the embodiments described may be made without departing from the spirit of my invention. Accordingly, the scope of my invention is set forth in the following claims.

I claim:

1. An electronically operated liquid level gauge comprising: a heterodyne network having amplifier, band pass filter, vacuum tube detector, crystal controlled vacuum tube fixed frequency oscillator, and vacuum tube variable frequency oscillator portions, said detector portion being operatively connected to the output of said oscillators for mixing the output signals therefrom and producing a modulated wave, said oscillator portions being normally operated at frequencies which differ by a prescribed amount, said modulated wave including an energy component normally having a frequency equivalent to said amount, said filter portion having a pass band which includes the frequency of said component, sharp attenuation characteristics above and below the frequency of said component, and being tuned above the upper band frequency, said filter also being operatively connected between said detector and amplifier portions, said amplifier portion providing an amplified output signal having a frequency equivalent to the frequency of said component; a variable resonance circuit adapted for tuning said variable oscillator portion, said circuit including a variable capacitance portion having a variable capacitor comprising a liquid having a measurable dielectric constant, a container for said liquid and a probe adapted for mounting in said container and for at least partial immersion in said liquid, said liquid being electrically in series between said container and probe upon said immersion, said probe having an electrically conductive part which is insulated from said container and liquid, and low capacitance means operatively connecting said probe in said variable capacitance portion, one end of said electrically conductive part being connected to said means, the capacitance of said variable portion being related to the area of contact between said probe and liquid, the frequency of said variable oscillator portion and of said energy component being related to said capacitance, the amplitude of said amplifier output signal being related to the frequency of said component; rectifier means providing a D.C. signal the magnitude of which is related to said amplitude, the magnitude of said D.C. signal being substantially zero when the frequency of said component is above said upper band frequency; and D.C. responsive means indicating the amount of contact area between said probe and liquid.

2. The apparatus of claim 1 in which said D.C. responsive means comprises a meter calibrated to indicate depth of said liquid.

3. The apparatus of claim 1 in which said D.C. responsive means comprises a recording meter calibrated to provide a record of the depth of said liquid.

4. The apparatus of claim 1 and including D.C. responsive circuits adapted to operate a valve and close the same when said magnitude is substantially zero.

5. The apparatus of claim 1 in which said probe electrically conductive part comprises a coil of prescribed inductance.

6. The apparatus of claim 5 in which said coil is wound on a core of tetrafluorethylene polymer material and is encased in a sheath of the same material.

7. The apparatus of claim 2 in which said low capacitance means comprises a coaxial cable.

8. An electronically operated gauge for automatically indicating the level of liquid in a container, said gauge comprising:
 (a) oscillator means including a tuned resonant circuit for producing a variable frequency output signal,
 (b) probe means adapted to mount in said container and provided to vary the operating frequency of said oscillator in response to changes in container liquid level, said probe including a variable capacitor comprising said container, said liquid and an insulated sensing element,
 (c) first circuit means for operatively connecting said probe to said resonant circuit,
 (d) second circuit means for translating the frequency of said oscillator output signal to a substantially lower frequency signal,
 (e) filter means for translating frequency variations in said lower frequency signal to an indicator control signal having corresponding amplitude variations,
 (f) and means responsive to said control signal for indicating the amplitude thereof.

9. The apparatus of claim 8 wherein said oscillator operates at a variable radio-frequency, and said second circuit means is adapted to translate the variable radio-frequency signal of said oscillator to a variable audio frequency.

References Cited in the file of this patent

UNITED STATES PATENTS

| | | |
|---|---|---|
| Re. 23,368 | Grob | May 22, 1951 |
| 2,280,678 | Waymouth | Apr. 21, 1942 |
| 2,310,910 | Rust et al. | Feb. 9, 1943 |
| 2,354,964 | Ostermann et al. | Aug. 1, 1944 |
| 2,536,111 | Van Dyke | Jan. 2, 1951 |
| 2,621,517 | Sontheimer | Dec. 16, 1952 |
| 2,657,579 | Milsom | Nov. 3, 1953 |
| 2,721,267 | Collins | Oct. 18, 1955 |
| 2,817,234 | Campbell | Dec. 24, 1957 |
| 2,852,937 | Maze | Sept. 23, 1958 |
| 2,879,388 | George | Mar. 24, 1959 |
| 2,929,020 | Mayes | May 15, 1960 |
| 2,946,991 | Lindenberg | July 26, 1960 |